(12) United States Patent
Li et al.

(10) Patent No.: US 10,627,657 B2
(45) Date of Patent: Apr. 21, 2020

(54) LIGHTING JIG AND LIGHTING METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Shijun Li, Beijing (CN); Song Wu, Beijing (CN); Xiaoming Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei, Anhui (CN)

( * ) Notice: Subject to any disclaimer, the term of this patent is extended or adjusted under 35 U.S.C. 154(b) by 189 days.

(21) Appl. No.: 15/536,463

(22) PCT Filed: Oct. 21, 2016

(86) PCT No.: PCT/CN2016/102859
§ 371 (c)(1),
(2) Date: Jun. 15, 2017

(87) PCT Pub. No.: WO2017/128778
PCT Pub. Date: Aug. 3, 2017

(65) Prior Publication Data
US 2018/0045988 A1    Feb. 15, 2018

(30) Foreign Application Priority Data

Jan. 29, 2016  (CN) .......................... 2016 1 0065927

(51) Int. Cl.
*G02F 1/13*  (2006.01)
*G09G 3/00*  (2006.01)
(Continued)

(52) U.S. Cl.
CPC .......... *G02F 1/1309* (2013.01); *G02F 1/1362* (2013.01); *G02F 1/133305* (2013.01);
(Continued)

(58) Field of Classification Search
CPC ................. G02F 1/1309; G02F 1/1362; G02F 1/133305; G02F 2001/136254;
(Continued)

(56) References Cited

U.S. PATENT DOCUMENTS

2008/0062348 A1* 3/2008 Sasuga .............. G02F 1/133308
349/58
2009/0102774 A1* 4/2009 Hattori .............. G02F 1/133382
345/92

(Continued)

FOREIGN PATENT DOCUMENTS

CN        101540134 A     9/2009
CN        102967954 A     3/2013
(Continued)

OTHER PUBLICATIONS

International Search Report and Written Opinion dated Jan. 20, 2017; PCT/CN2016/102859.

*Primary Examiner* — Akm Zakaria

(57) ABSTRACT

A lighting jig and lighting method are disclosed. The lighting jig includes: a signal generator; a data signal circuit board connected with the signal generator, the data signal circuit board being configured to split the data signal and the scanning signal; at least one data signal probe piece connected with the data signal circuit board; and at least one scanning signal circuit board connected with the data signal circuit board, the scanning signal circuit board being connected with a scanning signal probe piece. The lighting jig improves the stability of signal loadings.

6 Claims, 3 Drawing Sheets

(51) Int. Cl.
*G02F 1/1362* (2006.01)
*G02F 1/1333* (2006.01)
*G09G 3/36* (2006.01)

(52) U.S. Cl.
CPC ............... *G09G 3/00* (2013.01); *G09G 3/006* (2013.01); *G02F 2001/136254* (2013.01); *G02F 2001/136263* (2013.01); *G09G 3/3648* (2013.01)

(58) Field of Classification Search
CPC ........ G02F 2001/136263; G09G 3/006; G09G 3/00; G09G 3/3648
See application file for complete search history.

(56) References Cited

U.S. PATENT DOCUMENTS

| | | | | |
|---|---|---|---|---|
| 2012/0013592 | A1* | 1/2012 | Park | G09G 3/36 345/211 |
| 2013/0321020 | A1* | 12/2013 | Huang | G09G 3/006 324/760.01 |
| 2014/0139256 | A1* | 5/2014 | Huang | G09G 3/006 324/760.02 |
| 2014/0375344 | A1 | 12/2014 | Wang | |

FOREIGN PATENT DOCUMENTS

| | | |
|---|---|---|
| CN | 103325327 A | 9/2013 |
| CN | 104360509 A | 2/2015 |
| CN | 105445979 A | 3/2016 |
| KR | 1020060022498 A | 3/2006 |

\* cited by examiner

LIGHTING JIG AND LIGHTING METHOD

TECHNICAL FIELD

Embodiments of present disclosure relate to a lighting jig and a lighting method.

BACKGROUND

The checking process after a panel has been subjected to a cell-assembling process is an important test process for the thin film transistor liquid crystal display (TFT-LCD) industry. Such a process is not only used to provide timely feedback for the defectiveness in a preceding process, but also to assume the task of eliminating undesirable products so as to avoid waste of materials in subsequent processes. The current checking manners are mainly divided into full contact detection and short-circuit bar detection. The full contact detection manner is the more popular detection manner at present.

In a current lighting (power up to allow the display panel to work) jig design, the drive signal is input from the access point for data signal, and the common voltage signal Vcom is also input from the access point for data signal; the clock signal, the thin film transistor switch signal are also input from the access point for data signal. Therefore, the access point for data signal owns several functions together, thus its structure becomes very complicated and thus it is easy to be damaged, causing abnormal lighting.

SUMMARY

The embodiments of present disclosure provides a lighting jig and a lighting method for improving the lighting stability of the lighting jig.

An embodiment of the present disclosure provides a lighting jig, comprising: a signal generator; a data signal circuit board connected with the signal generator, the data signal circuit board being configured to split the data signal and the scanning signal; at least one data signal probe piece connected with the data signal circuit board, wherein the split data signal is input to a data port of a liquid crystal display panel through the data signal probe piece; and at least one scanning signal circuit board connected with the data signal circuit board, wherein the scanning signal circuit board is connected with a scanning signal probe piece, the split scanning signal is input to a scanning port of the liquid crystal display panel through the scanning signal probe piece.

For example, in the lighting jig, the data signal circuit board is connected with a print circuit board through a flexible printed circuit, and the print circuit board is connected with the data signal probe piece through the flexible printed circuit.

For example, the lighting jig comprises a plurality of data signal probe pieces.

For example, the lighting jig comprises two scanning signal circuit boards, wherein the two scanning signal circuit boards are provided at both sides of the liquid crystal display panel respectively, and are in signal connection with the liquid crystal display panel through the signal probe pieces respectively.

For example, in the lighting jig, a side of the scanning signal circuit board is provided with a thin film transistor switch signal input port, a first time signal input port, and a second time signal input port.

For example, in the lighting jig, the plurality of scanning signal probe pieces are arranged in a single row on the scanning signal circuit board at a side adjacent to the side where the first time signal input port is located, and the thin film transistor switch signal input port is connected with each of the scanning signal probe pieces through a signal wire.

For example, in the lighting jig, the first time signal input port is in signal connection with a scanning signal probe piece farthest from the first time signal input port through a signal wire, the second time signal input port is connected with a scanning signal probe piece closest to the second time signal input port through a signal wire, and a signal wire for transmitting the second time signal is connected between the adjacent two scanning signal probe pieces.

For example, in the lighting jig, the scanning signal probe piece comprises a scanning signal chip-on-film, and a protruding chip-on-film connected with the scanning signal chip-on-film through a flexible printed circuit, the scanning signal chip-on-film is in signal connection with the scanning signal circuit board, and the protruding chip-on-film is in signal connection with the liquid crystal display panel.

For example, in the lighting jig, the data signal circuit board is in signal connection with the scanning signal circuit board through a flexible printed circuit.

An embodiment of the present disclosure provides a lighting method, comprising: splitting a data signal and a scanning signal generated by a signal generator; inputting the split data signal to a data port of a liquid crystal display panel; and inputting the split scanning signal to a scanning port of the liquid crystal display panel.

For example, the scanning signal comprises at least a first time signal and a second time signal, the lighting method further comprises: transmitting the first time signal into a scanning signal probe piece farthest from the input end of the scanning signal circuit board; and sequentially transmitting the second time signal from the scanning signal probe piece closest to the input end of the scanning signal circuit board to all the scanning signal probe pieces.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1—signal generator; 2—data signal circuit board; 3—print circuit board; 4—data signal probe piece; 5—scanning signal circuit board; 51—thin film transistor switch signal input port; 52—first time signal input port; 53—second time signal input port; 6—scanning signal probe piece; 61—scanning signal chip-on-film; 62—protruding chipon-film; 63—Dead end; 7—liquid crystal display panel; 8, 9, 10, 11—flexible printed circuit

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
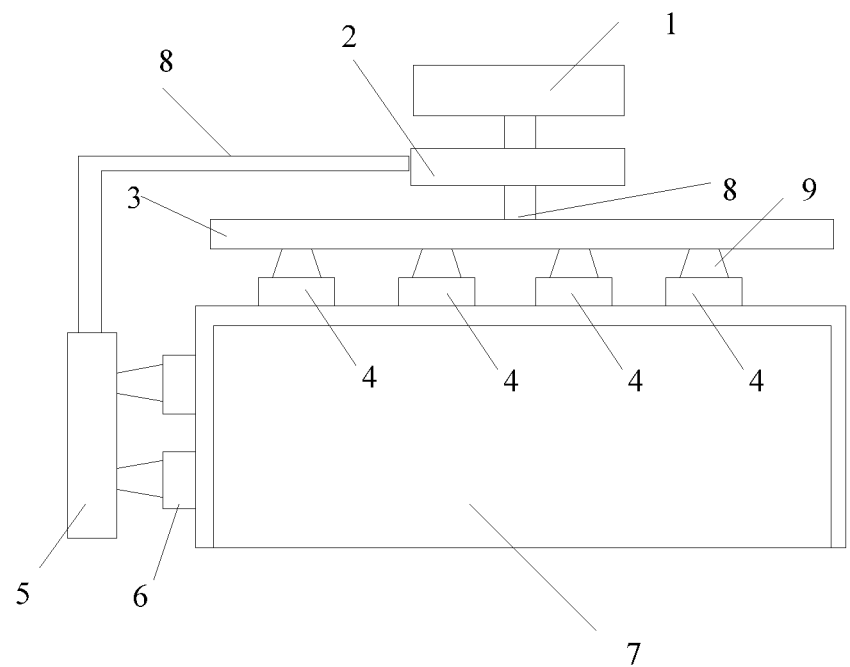
FIGS. 1A and 1B are structural block diagrams showing the lighting jig provided by an embodiment of present disclosure.
Figure 1B:
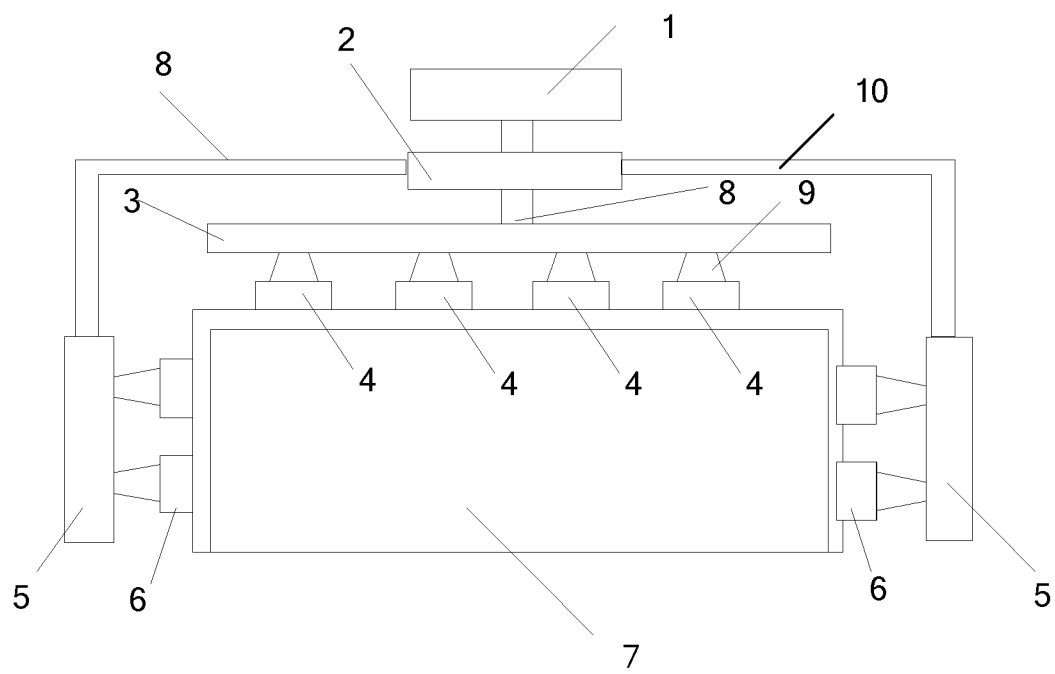

FIGS. 1A and 1B are structural block diagrams showing the lighting jig provided by an embodiment of present disclosure.

The embodiment of present disclosure provides a lighting jig, referring to FIGS. 1A and 1B, the lighting jig comprises a signal generator 1 and a data signal circuit board 2 connected with the signal generator 1.

The data signal circuit board 2 is configured to split the data signal and scanning signal; the data signal circuit board 2 is connected with a data signal probe piece 4, the split data signal is input to the data port of the liquid crystal display panel 7 to be detected through the data signal probe piece 4. The data signal circuit board 2 also is connected with a scanning signal circuit board 5, the scanning signal circuit board 5 is connected with a scanning signal probe piece 6, and the split scanning signal is input to the scanning port of the liquid crystal display panel 7 to be detected.

In the above embodiment, the signals generated by the signal generator 1 (comprising data signals and drive signals) are split by the data signal circuit board 2, the data signals (for example, drive signals) are transmitted into the liquid crystal display panel 7 through data signal probe pieces 4; the scanning signals (for example, the clock signal, thin film transistor (TFT) switch signal) are transmitted into the liquid crystal display panel 7 through the scanning signal circuit board 5 and scanning signal probe pieces 6. Such a signal transmission manner for lighting can improve the stability of signal loading.

In order to facilitate the understanding of the structure and working principle of the lighting jig provided in an embodiment of the present disclosure, it will be described in detail below with reference to the accompanying drawings and specific examples.

With continued reference to FIGS. 1A and 1B, the data signal circuit board 2 is connected with a print circuit board 3 through a flexible printed circuit 8 for example, and the print circuit board 3 is connected with a data signal probe piece 4 through a flexible printed circuit 9 for example. There are a plurality of data signal probe pieces 4, and the plurality of data signal probe pieces 4 are arranged in a single row. The number of the data signal probe pieces 4 may be set in accordance with the parameter (e.g., resolution) of the liquid crystal display panel 7 to be detected.

Referring to FIG. 1A, in one example, it is possible to provide one scanning signal circuit board 5 which is provided at a side of the liquid crystal display panel 7 and is in signal connection with the liquid crystal display panel 7 through a scanning signal probe piece 6 corresponding to the scanning signal circuit board, and this example corresponds to the case of unilaterally drive for the liquid crystal display panel; referring to FIG. 1B, in one example, it is possible to provide two scanning signal circuit boards 5 which are provided at both sides of the liquid crystal display panel 7 respectively and are in signal connection with the liquid crystal display panel 7 through scanning signal probe pieces 6 corresponding to the scanning signal circuit boards respectively, and this example corresponds to the case of bilaterally drive for the liquid crystal display panel.

After output from the signal generator 1, the data signals and the scanning signals are split by the data signal circuit board 2, the data signals are input to the data lines of the liquid crystal display panel 7 through the print circuit board 3 and the data signal probe pieces 4; the scanning signals are transmitted to the scanning signal circuit board 5 through the flexible printed circuit and then is transmitted to the side of the scanning signal lines of the liquid crystal display panel 7 through the scanning signal probe pieces 6. As can be seen from the above description, in the above described embodiment, the signals generated from the signal generator 1 are split by the data signal circuit board 2, the drive signals are transmitted into the liquid crystal display panel 7 through the data signal probe pieces 4; the clock signal, the TFT switch signal, and the like are transmitted into the liquid crystal display panel 7 through the scanning signal circuit board 5 and the scanning signal probe pieces 6. Such a signal transmission manner for lighting improves the stability of signal loading.

Figure 2:
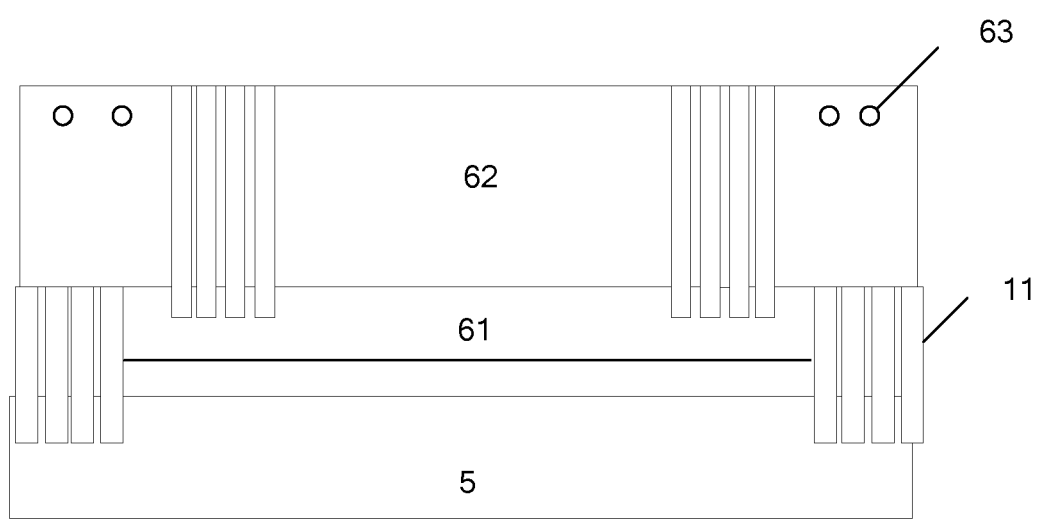
FIG. 2 is a structural block diagram of the scanning signal probe piece of the lighting jig provided by an embodiment of present disclosure.

The structure of an exemplary scanning signal probe piece 6 is illustrated in FIG. 2. The scanning signal probe piece 6 comprises a scanning signal chip-on-film 61 and a protruding chip-on-film 62 connected with the scanning signal chip-on-film 61. The scanning signal chip-on-film 61 is connected with the scanning signal circuit board 5 through a flexible printed circuit 11, and the protruding chip-on-film 62 is in signal connection with the liquid crystal display panel 7. The scanning signal circuit board 5 is connected with the data signal circuit board 2 through the flexible printed circuit 10. The scanning signal is transmitted to the scanning signal chip-on-film 61; the flexible printed circuit 11 is connected to both sides of the scanning signal chip-on-film 61; the signals, input to each row of the grid lines simultaneously, are transmitted to the liquid crystal display panel 7 by the scanning signal chip-on-film 61 through the protruding chip-on-film 62, as illustrated in FIG. 2, the intermediate scanning signal of the scanning signal chip-on-film 61 is connected with the protruding chip-on-film 62. Both sides of the protruding chip-on-film 62 can be provided with a dead end 63, and the dead end 63 is used to align with the terminal on the liquid crystal display 7 without carrying out signal transmission.

Figure 3:
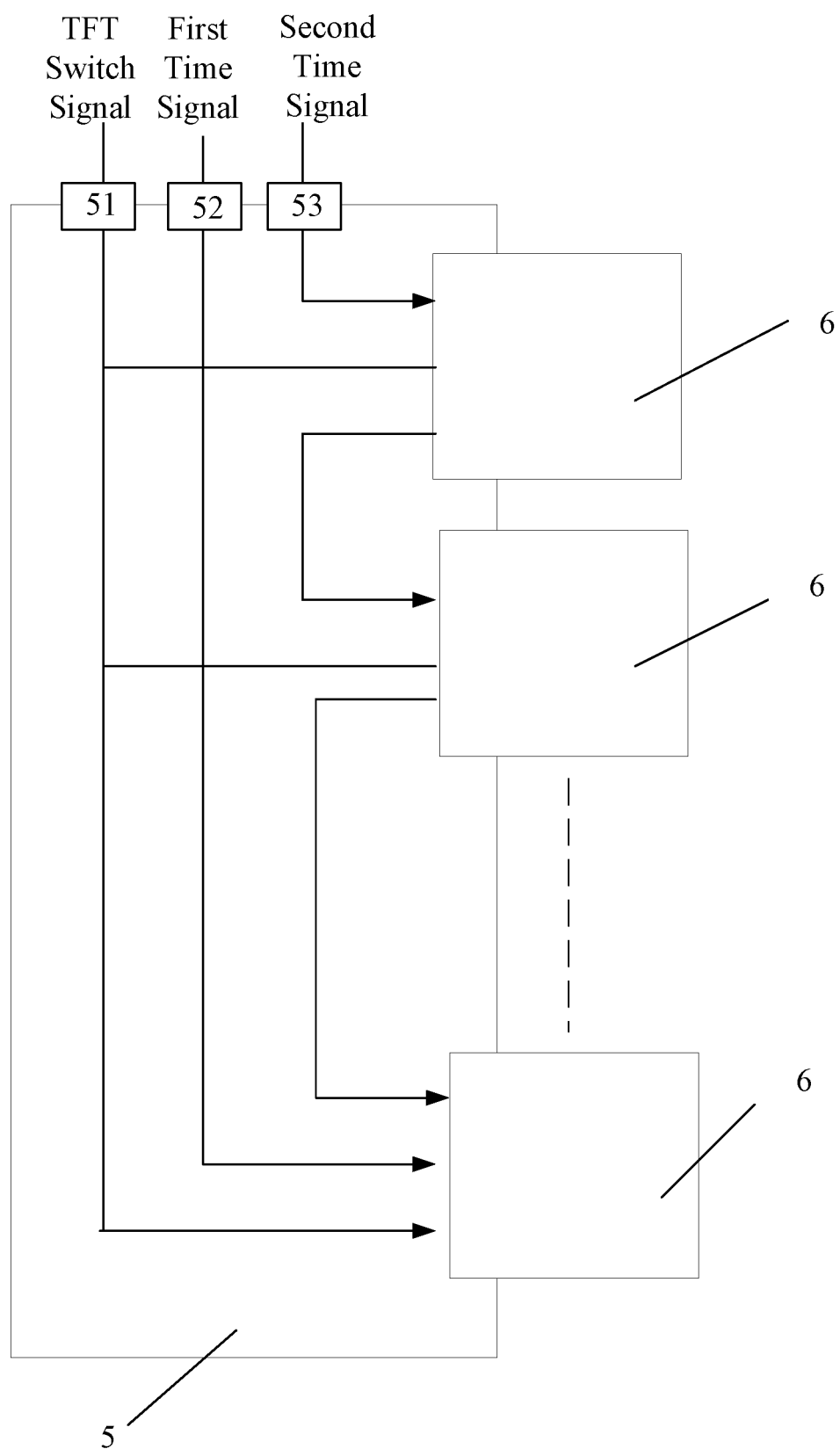
FIG. 3 is a schematic diagram showing the operation of the scanning signal circuit board of the lighting jig provided by an embodiment of present disclosure.

The design of an exemplary scanning signal circuit board 5 is illustrated in FIG. 3. A side of the scanning signal circuit board 5 is provided with a thin film transistor switch signal input port 51, a first time signal input port 52, and a second time signal input port 53. The plurality of scanning signal probe pieces 6 are arranged in a single row on the scanning signal circuit board at a side adjacent to the side where the first time signal input port 52 is located, and the thin film transistor switch signal input port 51 is connected with each of the scanning signal probe pieces through signal wires. The first time signal input port 52 is in signal connection with the scanning signal probe piece 6 farthest from the first time signal input port 52 through a signal wire. The second time signal input port 53 is connected with the scanning signal probe piece 6 closest to the second time signal input port 53 through a signal wire, and a signal wire for transmitting the second time signal is connected between the adjacent two scanning signal probe pieces 6.

In use, the scanning signal circuit board 5 is used to sequentially transmit the second time signal from the scanning signal probe piece 6 adjacent to the input end of the scanning signal circuit board 5 to the most distal scanning signal probe piece 6. More specifically, the TFT switch signal is input from the thin film transistor switch signal input port 51, and is transmitted to each of the scanning signal chip-on-films 61 in parallel through a signal wire, the second clock signal is input from a side of the scanning signal chip-on-film 61 and output from the other side thereof, then enters into another scanning signal chip-on-film 61, sequentially connecting in series the scanning signal chip-on-films 61, and the first clock signal is directly input into the last scanning signal chip-on-film 61.

In contrast, the traditional clock signal transmission path is: the first and second clock signals are input from the data signal terminal of the liquid crystal display panel 7, transmitted to the scanning signal probe piece from inner lines of the liquid crystal display panel 7, flow through the inner lines of the scanning signal probe piece, then are transmitted to the scanning signal probe piece through the inner lines of the liquid crystal display panel 7, and so on. For the transmission of the clock signals between the wires inside the scanning signal probe piece and those inside the liquid crystal display panel 7, it is required that the scanning signal probe piece and the scanning signal terminal be perfectly aligned, and once the alignment is not accurate, signal transmission failure will occur.

As can be seen from the above description, with such a transmission mode of the clock signals between the scanning signal circuit board and the scanning signal probe piece(s) in the embodiments of the present disclosure, the failure of signal transmission caused by alignment failure can be reduced to zero, and therefore, such a PCB design allows the clock signal transmission to be more stable, thus the scanning signal transmission is made more stable, eventually depressing the abnormal lighting situations.

Furthermore, an embodiment of present disclosure also provides a lighting method utilizing the above lighting jig, and the method comprises the following operations: splitting a data signal and a scanning signal generated by the signal generator; inputting the split data signal to the data port of the liquid crystal display panel; and inputting the split scanning signal to the scanning port of the liquid crystal display panel.

In the above embodiment, the signals generated by the signal generator 1 (comprising the data signals and the drive signals) are split via the data signal circuit board 2, the data signals (for example, the drive signals) are transmitted into the liquid crystal display panel 7 through the data signal probe pieces 4; the scanning signals (for example, the clock signal, thin film transistor (TFT) switch signal) are transmitted into the liquid crystal display panel 7 through the scanning signal circuit board 5 and the scanning signal probe pieces 6. Such a signal transmission manner for lighting improves the stability of signal loading.

For example, the scanning signal comprises at least a first time signal and a second time signal, and this method may further comprise: transmitting the first time signal to the scanning signal probe piece 6 far from the input end of the scanning signal circuit board; and sequentially transmitting the second time signal from the scanning signal probe piece 6 adjacent to the input end of the scanning signal circuit board to all the scanning signal probe pieces 6.

For example, the TFT switch signal is input from the thin film transistor switch signal input port 51, and is transmitted to each of the scanning signal chip-on-films 61 in parallel through a signal wire, the second clock signal is input from a side of the scanning signal chip-on-film 61 and output from the other side thereof, then enters into another scanning signal chip-on-film 61, sequentially connecting in series the scanning signal chip-on-films 61, and the first clock signal is directly input into the last scanning signal chip-on-film 61. In contrast, the traditional clock signal transmission path is as follows: both the first and second clock signals are input from the data signal terminals of the liquid crystal display panel 7, transmitted to a scanning signal probe piece from inner lines of the liquid crystal display panel 7, flow through the interior of the scanning signal probe piece, then are transmitted to another scanning signal probe piece through the inner lines of the liquid crystal display panel 7, and so on. For the transmission of the clock signals between the wires inside the scanning signal probe pieces and the wires inside the liquid crystal display panel 7, it is required that the scanning signal probe piece and the scanning signal terminal be perfectly aligned therebetween, once the alignment is not accurate, signal transmission failure will occur. As can be seen from the above description, with such a transmission mode of the clock signals between the scanning signal circuit board and the scanning signal probe piece(s) in the embodiment of the present disclosure, the failure of signal transmission caused by alignment failure can be reduced to zero, and therefore, such a PCB design makes the clock signal transmission more stable, thus the scanning signal transmission is made more stable, eventually depressing the abnormal lighting situations.

What are described above is related to the illustrative embodiments of the disclosure only and not limitative to the scope of the disclosure; the scopes of the disclosure are defined by the accompanying claims.

The application claims priority to the Chinese patent application No. 201610065927.2, filed Jan. 29, 2016, the entire disclosure of which is incorporated herein by reference as part of the present application.

What is claimed is:
1. A lighting jig, comprising:
a signal generator configured for generating a signal;
a data signal circuit board, an input terminal of which is connected with the signal generator, the data signal circuit board being configured to receive the signal from the signal generator through the input terminal and further to split the signal into a data signal and a scanning signal;

a data signal probe piece connected with a first output terminal of the data signal circuit board to receive the data signal, wherein the data signal is input to a data port of a liquid crystal display panel through the data signal probe piece;

a plurality of scanning signal probe pieces; and a scanning signal circuit board which is outside a display region of the liquid crystal display panel and is connected with a second output terminal of the data signal circuit board to receive the scanning signal, wherein the scanning signal circuit board is connected with the plurality of scanning signal probe pieces, and the scanning signal is input to a scanning port of the liquid crystal display panel through the plurality of scanning signal probe pieces, wherein a side of each of the scanning signal circuit board is provided with a thin film transistor switch signal input port, a first time signal input port, and a second time signal input port;

the plurality of scanning signal probe pieces are arranged in a single row on the scanning signal circuit board at a side adjacent to the side where the first time signal input port is located, and the thin film transistor switch signal input port is connected with each of the scanning signal probe pieces through a first signal wire; and the first time signal input port is in signal connection with a scanning signal probe piece farthest from the first time signal input port through a second signal wire, the second time signal input port is connected with a scanning signal probe piece closest to the second time signal input port through a third signal wire, and a fourth signal wire for transmitting the second time signal is connected between adjacent two scanning signal probe pieces.

2. The lighting jig according to claim 1, wherein the data signal circuit board is connected with a print circuit board through a first flexible printed circuit, and the print circuit board is connected with the data signal probe piece through a second flexible printed circuit.

3. The lighting jig according to claim 2, comprising a plurality of data signal probe pieces.

4. The lighting jig according to claim 1, wherein the scanning signal probe piece comprises a scanning signal chip-on-film, and a protruding chip-on-film connected with the scanning signal chip-on-film through a first flexible printed circuit, wherein the scanning signal chip-on-film is in signal connection with the scanning signal circuit board connected with the scanning signal probe piece, and the protruding chip-on-film is in signal connection with the liquid crystal display panel.

5. The lighting jig according to claim 4, wherein the data signal circuit board is in signal connection with each of the two scanning signal circuit boards through a second flexible printed circuit.

6. A lighting method, comprising:

a signal generator generating a signal;

a data signal circuit board receiving the signal from the signal generator, splitting the signal into a data signal and a scanning signal, and further inputting the data signal to a data port of a liquid crystal display panel through a data signal probe piece; and two scanning signal circuit boards provided at both sides of the liquid crystal display panel respectively, each of which receiving the scanning signal from the data signal circuit board and inputting the scanning signal to a scanning port of the liquid crystal display panel through a scanning signal probe piece, wherein the scanning signal comprises at least a first time signal and a second time signal, the lighting method further comprises:

transmitting the first time signal into a scanning signal probe piece farthest from an input end of each of the two scanning signal circuit boards; and sequentially transmitting the second time signal from the scanning signal probe piece closest to the input end of each of the two scanning signal circuit boards to all the scanning signal probe pieces.

* * * * *